Jan. 18, 1966

C. H. NICKELL 3,229,550

VARIABLE HYDRAULICALLY AND MECHANICALLY LOCKING DIFFERENTIAL

Filed Feb. 2, 1962

INVENTOR
CLAUDE H. NICKELL

BY
ATTORNEY

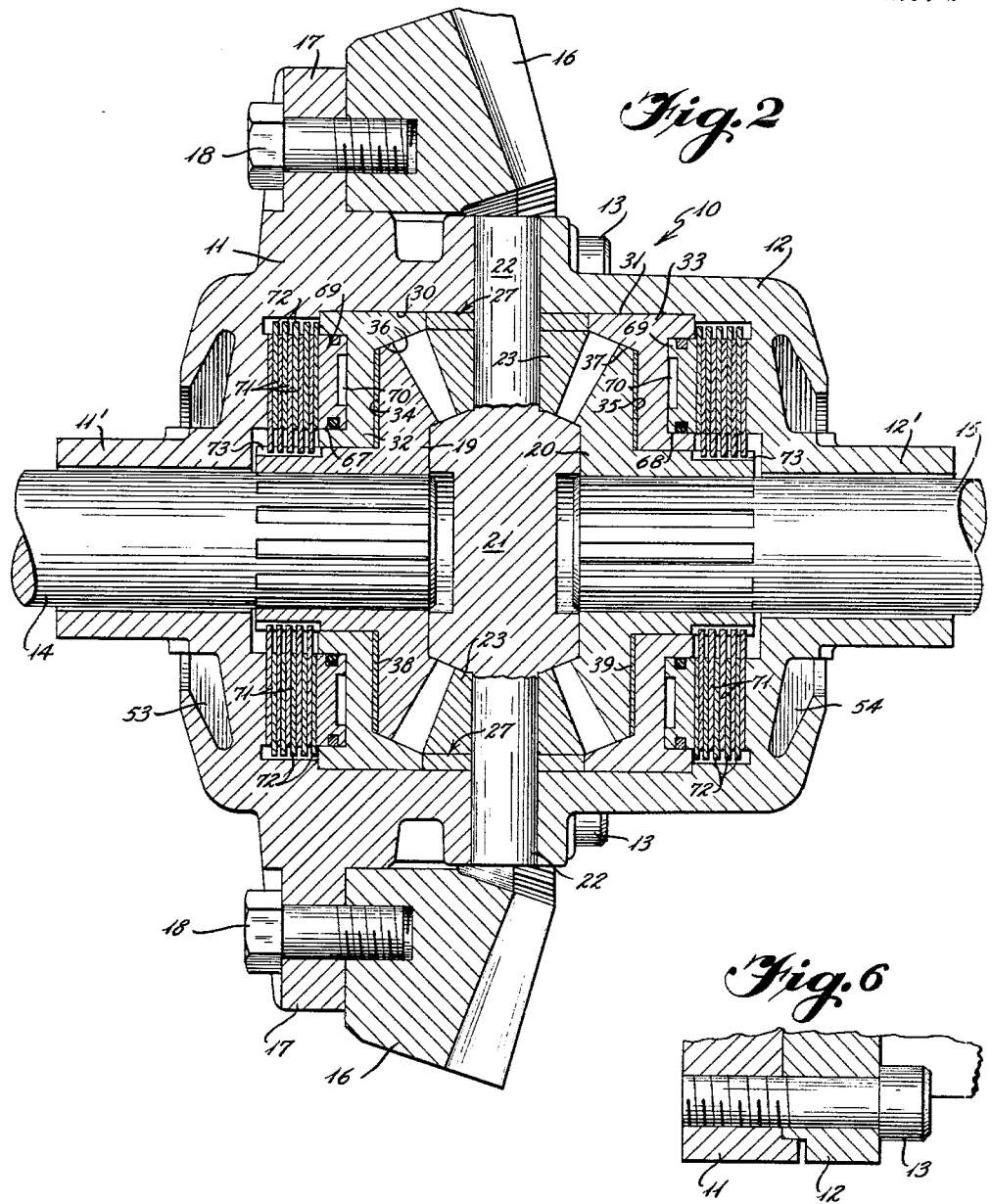

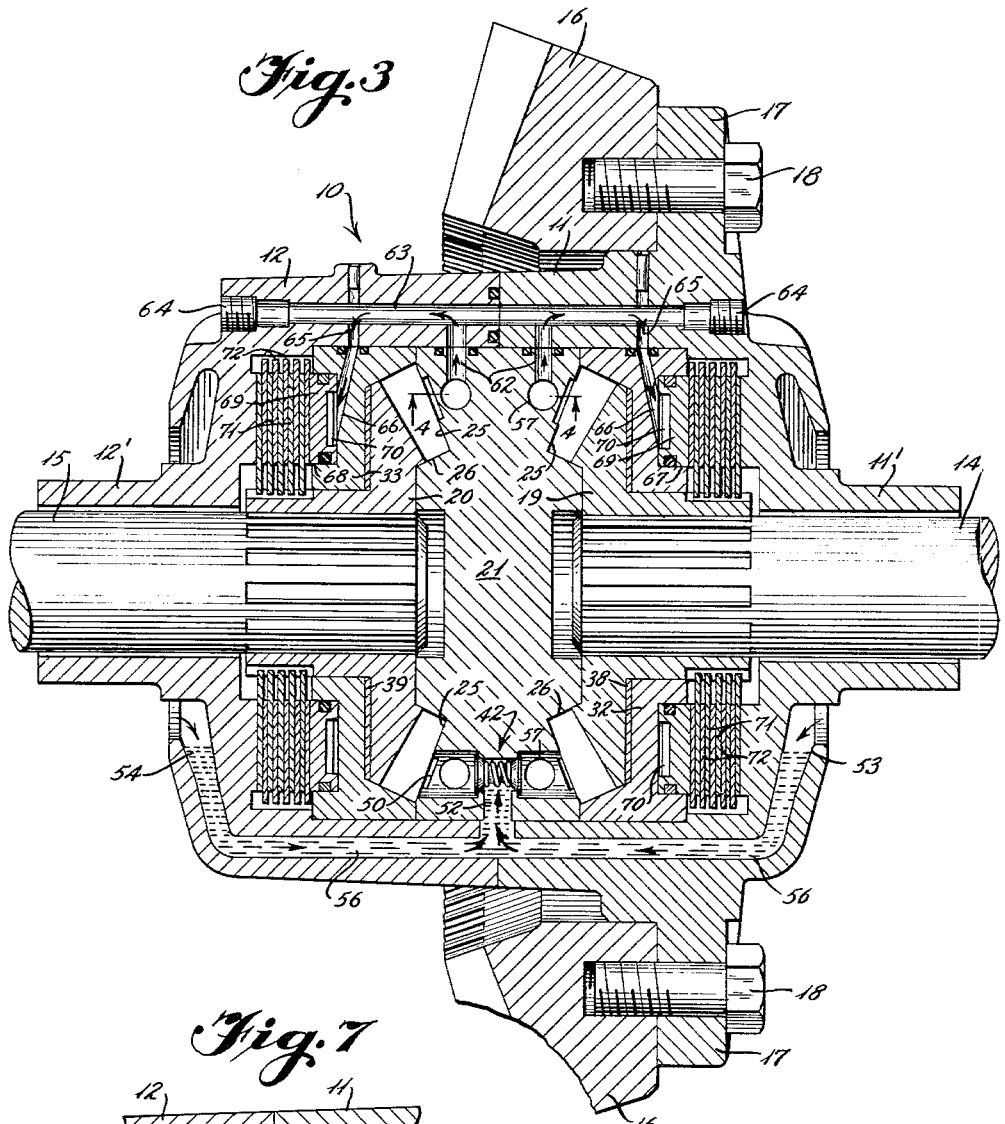

the line 4—4 of FIG. 3;
United States Patent Office
3,229,550
Patented Jan. 18, 1966

3,229,550
VARIABLE HYDRAULICALLY AND MECHANICALLY LOCKING DIFFERENTIAL
Claude H. Nickell, 17809 Oakwood Blvd.,
Dearborn, Mich.
Filed Feb. 2, 1962, Ser. No. 170,739
5 Claims. (Cl. 74—711)

This invention relates to power transmission including from a source or driving member to two or more other members sought to be driven, and to means automatically for effecting such transfer of power selectively to one or more of such driven members when required by one or more of such driven members.

The invention relates particularly to a differential appropriate for use on a vehicle having a source of motive power for transmitting torque from a power plant such as, for example, an internal combustion engine to two or more output shafts or axles and wheels or driven members, and to means which operate automatically for transferring such torque to selected driven members when other driven members begin to slip and lose traction with no driving force.

Heretofore, various mechanisms have been constructed for transmitting driving torque from a driving source to a plurality of driven members including manually controlled external oil pumps, clutch means, manual control means, and the like, but these prior devices have been complicated, bulky, upreliable, had to be manually controlled and otherwise have proved unsatisfactory. Also, there has been no means for effecting alocking or braking of one or more of the driven members so that there would still be a driving action of the several driven members.

It is an object of the invention to provide an hydraulically and mechanically locking differential for driving multiple elements mobile or otherwise and having a mechanical gear train drive and braking mechanism, as for example, a plurality of fluid operated brake plates in which portions of the mechanical gear train function as fluid pumping means to force hydraulic fluid to actuate said braking mechanism, or against such brake plates, to create a partial lock and resist the free rotation of said gear train drive.

Another object of the invention is to provide an hydraulically and mechanically locking differential having a source of hydraulic fluid and a series of automatic directional flow control valve assemblies for introducing hydraulic fluid into the mechanical gear train drive so that such mechanical gear train drive can function as a fluid pump to force fluid against a fluid brake to create a partial lock and prevent the free rotation of a portion of said gear train drive.

A further object of the invention is to provide a differential having a mechanical gear train drive and one or more fluid operated brakes operatively associated with said mechanical drive and means for automatically applying pressure to such brake to resist the free rotation of the mechanical gear train drive.

Other objects and advantages of the invention will be apparent from the following description taken in conjunction with the accompanying drawings wherein:

FIG. 2 is a section along the line 2—2 of FIG. 1;

Figure 1:
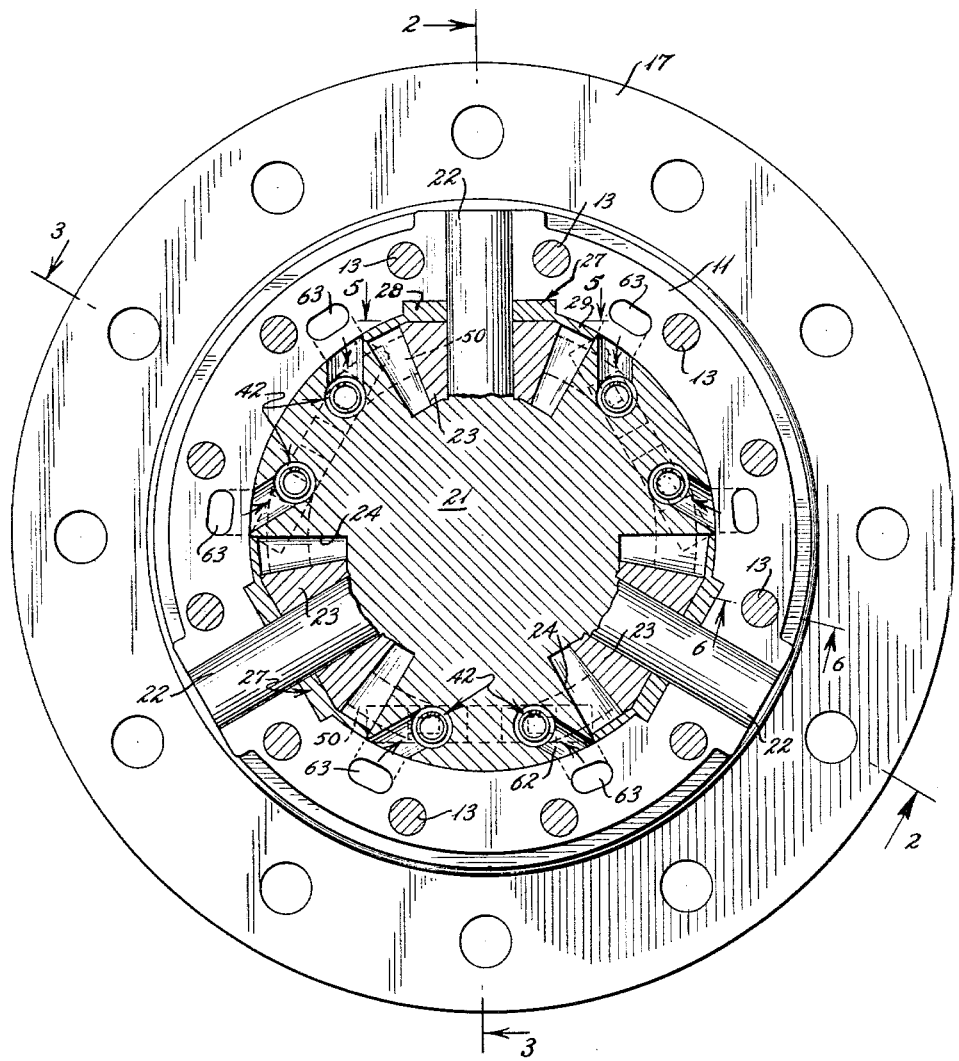
FIG. 1 is a vertical section of the differential of the present invention.
Figure 5:
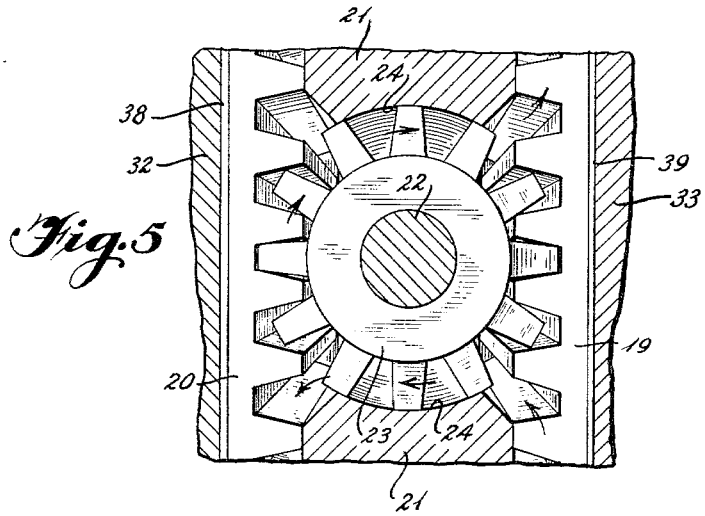
Figure 4:
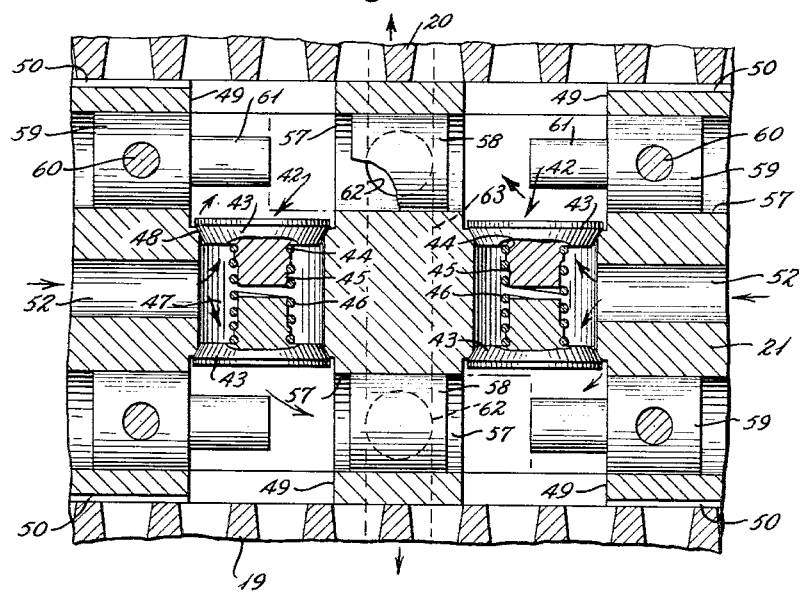

FIG. 3, a section along the line 3—3 of FIG. 1;
FIG. 4, an enlarged fragmentary detail section along the line 4—4 of FIG. 3;
FIG. 5, an enlarged fragmentary detail section along the line 5—5 of FIG. 1;
FIG. 6, an enlarged fragmentary detail section along the line 6—6 of FIG. 1; and
FIG. 7, an enlarged fragmentary detail section of a modified form of porting shown in FIG. 3.

Briefly stated, the present invention is a variable hydraulically and mechanically locking differential comprising a pair of differential casings, rotatably mounted on a pair of opposed output shafts, and including a pair of side gears removably attached to such output shafts, a shroud located intermediate said side gears and adapted to contain a plurality of compensating gears meshing with such side gears to form a mechanical gear train drive, the differential casings being provided with a plurality of automatic directional flow control valve assemblies whereby hydraulic fluid may be introduced into contact with the compensating gears to permit such compensating gears to function as fluid pumps and force the hydraulic fluid against one or more fluid operated brakes which are operatively associated with the side gears to create a partial lock to prevent the rapid rotation of one of such side gears relative to the other and to transmit driving torque to a selected output shaft.

With continued reference to the drawings, the present invention comprises a split or two-part differential casing 10 including cooperating interfitting portions 11 and 12 having hubs 11′ and 12′ respectively within which a pair of opposed axles or output shafts 14 and 15 are floatably received. The portions 11 and 12 are connected by fasteners 13 and are adapted to be rotated by any conventional driving member such as a bevel gear 16 removably attached to a projection 17 on the member 11 by bolts or other fasteners 18.

The inner ends of the shafts 14 and 15 are splined or otherwise removably attached to bevel or side gears 19 and 20 respectively. In order to provide a mechanical gear train drive, a shroud 21 is provided having a plurality of outwardly projecting pins 22, each of which is adapted to receive a compensating gear 23 which meshes with both of the side gears 19 and 20. The compensating gears 23 are received within recesses 24 in the shroud 21 and the apex of the teeth are in close proximity to such recesses to limit the free transfer of oil or hydraulic fluid from one side of the shroud to the other. The shroud is provided with an annular groove 25 in which the teeth of the side gears 20 are adapted to rotate and the lower portion 26 of such annular groove is substantially normal to the pitch line of the teeth.

During the normal operation of the device, the side gears 19 and 20 and the compensating gears 23 tend to spread apart and become disengaged due to normal mechanical separating force caused by the involute form of the gear teeth. In order to take advantage of this action, each of the compensating gears 23 is provided with a combination thrust plate and sealing member 27 having a central raised portion 28 and a pair of outwardly extending arcuate wings 29, located substantially normal to the pitch line of the teeth of the compensating gears, which function as an oil seal member to prevent the flow of oil along the sides of the teeth of said compensating gears. The thrust plate 27 preferably is constructed of a frictional material such as sintered bronze or the like to resist the free portion of the compensating gears 23. Also the plate 27 provides a bearing surface to prevent excessive wear on both the thrust bearings and the compensating gears.

The differential portions 11 and 12 are provided with internal recesses 30 and 31 respectively in which are received spacers 32 and 33 to maintain the shroud 21 substantially centrally of the casing 10. The spacers 32 and 33 have recesses 34 and 35 respectively with tapered portions 36 and 37 substantially normal to the pitch line of the interengaging teeth of the side gears 19 and 20 and compensating gears 23. The tapered portions 36 and 37 are located closely adjacent to the teeth of the side gears 19 and 20 to seal the outer edges of such teeth against the free flow of hydraulic fluid. Frictional bearing plates 38 and 39 of sintered bronze or the like are fixed to the recessed portion of spacers 32 and 33 respectively and provide bearing surfaces for the side gears 19 and 20. When the casing 10 is rotated rapidly the side and compensating gears tend to spread apart and disengage due to the mechanical separating force and because of such force the compensating gears will be forced into more intimate contact with the thrust plates and the side gears 19 and 20 will be forced into more intimate contact with the bearing plates 38 and 39 to increase the coefficient of friction against such gears to resist the free rotation thereof.

In order to provide a partial lock capable of producing variable locking action on the output shafts 14 and 15, the present invention contemplates the introduction of hydraulic fluid into the area of the intermeshing teeth of the side gears 19 and 20 and the compensating gears 23 and utilizing such compensating gears as fluid pumps to force such hydraulic fluid into opposed fluid brakes connected to the output shafts. This is accomplished by providing a plurality of automatic directional flow control valve assemblies 42, each of which includes a pair of opposed valve members 43 having a threaded shoulder 44 and a reduced stem 45. The threaded shoulders of the opposed valves are connected by a tension spring 46 under a predetermined stressed load which normally tends to urge the opposed valve members towards each other.

Each of the valve assemblies is located in a passageway 47 disposed substantially transversely of the shroud 21 and having a valve seat 48 at each of its outer ends against which the valve members 43 normally are compressed. An axial counterbore 49 is disposed at each end of the passageway 47 and each of such counterbores is in communication with one of the compensating gears by means of an arcuate channel 50 on each side of the shroud 21.

As illustrated in FIG. 3, hydraulic fluid is introduced into the valve assemblies 42 through an inlet opening 52 in the shroud 21 and such inlet openings are in communication with fluid wells 53 and 54 by means of fluid ports 55 and 56 respectively. The wells 53 and 54 are formed as an integral part of the differential casing portions 11 and 12 and are supplied with fluid from a conventional differential housing (not shown).

A pool or source of fluid is located in the lower portion of such differential housing and the lower portion of the driving member 16 is normally immersed in such hydraulic fluid. The hydraulic fluid adheres to such driving member and as the driving member is rotated, centrifugal force projects the hydraulic fluid outwardly against the differential housing and onto its conventional ribs or troughs which permit the fluid to drain downwardly into the wells 53 and 54. Such wells maintain a supply of fluid in their lowermost portions when the differential casing s not being rotated. Upon the rotation of the differential casing the wells will be filled around the entire periphery due to centrifugal force to supply hydraulic fluid to the individual valve assemblies.

As in a conventional differential, each of the output shafts 14 and 15 has its outer end connected to a driven member (not shown) and when said driven members are moving along a straight path of travel, the torque from the driving member 16 is transmitted equally to both driven members through the mechanical gear train drive. When one of the driven members loses traction, there is less reaction to the rotation of such driven members and consequently the side gear attached to that shaft increases its revolutions per minute and the majority of the torque transmitted from the driving member is, therefore, transmitted to the driven member which is slipping and the non-slipping driven member does not receive sufficient force or torque to move the vehicle.

When this condition arises the rapid rotation of one of the side gears creates a suction force against the automatic directional flow control valve assemblies 42 to open the valves 43 on the side of the rapidly rotating side gear to permit hydraulic fluid to flow through the counterbores 49. Such counterbores are connected by a cylindrical chamber 57 in which is located a reciprocating distributing valve or piston 58. Such piston is limited in its lengthwise travel by a pair of stops 59 fixed in position by fasteners 60 and having reduced portions 61 located in opposed relation at opposite ends of chamber 57.

With particular reference to FIGS. 4 and 5, if the side gear 20 is the gear which is rotating rapidly in the direction of the arrow the valves in the upper portion of FIG. 4 will open to permit fluid to flow into the counterbores 49 and since the shroud is rotating more rapidly than the gear 19, the valves in the lower portion of FIG. 4 also will open. Fluid which passes the upper left-hand valve and lower right-hand valve can flow around the reduced portions 61 of the stops 59 and out of such counterbore through channels 50 to engage the teeth of the compensating gears 23. The fluid, as it passes through the recesses 24, will substantially fill the cavity between the teeth of such compensating gears and such compensating gears will function as fluid pumps to force the hydraulic fluid through the channels 50 in the opposite side of the shroud 21 and illustrated in the lower left-hand portion and upper right-hand portion of FIG. 4. When the fluid under pressure enters the counterbores 49 at the lower left and upper right of FIG. 4, such fluid under pressure will close the associated valves 43 and slide the distributing valves 61 to the right and left respectively to expose exit ports 62. Fluid may then escape through the ports 62 into a longitudinal port 63 closed at both ends by plugs 64.

The ports 63 are in communication with ports 65 adjacent to the ends thereof and such ports 65 are in alignment with ports 66 within the spacers 32 and 33. The spacers 32 and 33 have annular channels 67 and 68 respectively for the reception of pressure pistons 69, each of which has an annular recessed groove or channel 70 into which the fluid under pressure is forced. The pressure pistons 69 bear against a plurality of brake plates 71 interspersed by a plurality of frictional bearing plates 72. The brake plates 71 are removably connected by splines 73 or other fastening means to the hubs of the side gears 19 and 20 so that when fluid under pressure is introduced into the annular channels 70, the pressure pistons 69 are forced against the brake plates 71 to apply an equal braking action to both of the side gears 19 or 20. It will be apparent that the faster the side gear is rotating, the more rapidly the compensating gears also will rotate and apply a greater force against the pressure pistons which in turn apply a greater force against the brake plates 71. When pressure is applied to the brake plates 71, the slipping driven member cannot turn freely and, therefore, the torque is transmitted to the non-slipping driven member. Since there is no reaction to the driven member which is slipping, substantially all of the torque will be transferred to the non-slipping member until such time as the slipping member again encounters resistance, whereupon the valve assemblies will close and both driven members will be rotated equally by the mechanical gear train drive. When the valve assemblies close, pressure on the pistons 69 is relieved by a bleed off across the valve 58.

In the event that the other driven member begins to slip, immediately after the first driven member regains traction the flow of fluid automatically will be reversed to transmit substantially all of the torque to the non-slipping member to move the vehicle ahead even through one of the driven members is slipping. Should both driven members begin slipping simultaneously, the side gears and compensating gears will function as a conventional differential mechanical gear train drive until at least one of the driven members encounters a reaction surface to permit the vehicle to move ahead.

When the device is applied to vehicles having multi-wheel drives, all of the driving members may be interconnected so that in the event that any of the members begin to slip, the torque from the driving force will be transmitted to the non-slipping members until such time as the slipping members again gain traction. Each pair of driven members is connected by one of the differentials of the present invention and in the event that both front and rear wheels are driven, the driving shafts may also be connected by a differential to equally distribute torque to all of the driving members.

In the above described modification, the port 63 permits fluid to flow to both sides of the differential casing to balance the force applied to the brake plates 71. As illustrated in FIG. 7, the braking action of the plates 71 may be operated independently by providing a pair of ports 80 and 81 in communication with the exit ports 62 to thereby apply pressure to either of the brake assemblies separately and independently of the other.

It is noted that the rotating side gears will function as fluid pumps to assist the flow of the oil and that a pair of valve assemblies 42 are associated with each compensating gear so that a partial oil lock will be formed regardless of which driven member is slipping or which direction the vehicle is moving.

It will be apparent from the foregoing that a differential is provided which effectively and inexpensively solves a problem which has long been present and unsolved, and provides an effective means for transmitting torque from the slipping driven member to a non-slipping member and thus enables a motor vehicle to operate in sand, mud, ice, snow and under other road conditions which has not heretofore been possible.

It will be obvious to those skilled in the art that various changes may be made in the invention without departing from the spirit and scope thereof and, therefore, the invention is not limited by that which is illustrated in the drawings and described in the specification, but only as indicated in the accompanying claims.

What is claimed is:

1. A variable hydraulically and mechanically locking differential comprising
    (A) a pair of output shafts,
    (B) a differential casing rotatably mounted on said shafts,
    (C) a mechanical gear train drive within said differential casing and including
        (1) a side gear removably mounted on each of said output shafts,
        (2) multiple compensating gears intermeshing with each of said side gears,
        (3) a shroud intermediate said side gears and adapted to receive said compensating gears,
    (D) means for supplying hydraulic fluid to said differential casing,
    (E) means for introducing said hydraulic fluid into the area of said compensating gears including
        (1) a series of automatic directional flow control valve assemblies located in said shroud,
        (2) said should having a series of ports connecting said valve assemblies and said compensating gears,
    (F) fluid operated brake mechanism operatively associated with said side gears and including
        (1) means providing a plurality of friction surfaces, and
        (2) means for applying pressure to said surfaces whereby when one of said output shafts rotates more rapidly than the other output shaft, said valve assemblies will automatically open to introduce hydraulic fluid into the compensating gears and such compensating gears will function as pumps to force said fluid against said means for applying pressure to effect a braking action against the free rotation of the rapidly rotating side gear.

2. The structure of claim 1 including
    (A) a thrust plate in operative association with the outer surface of each compensating gear and
    (B) frictional bearing plates in association with said side gears
whereby said thrust plates and said frictional bearing plates will resist the free rotation of said compensating and side gears respectively.

3. Apparatus for the transmitting of driving torque comprising
    (A) a plurality of output shafts,
    (B) a differential casing rotatably supported by said output shafts and including
        (1) a side gear removably attached to each of said output shafts,
        (2) a series of compensating gears meshing with said side gears and forming a mechanical gear train drive,
        (3) a shroud for holding said compensating gears,
        (4) fluid operated brake mechanism operatively associated with said side gears,
        (5) means for applying fluid pressure to said brake mechanisms.
    (C) means for supplying hydraulic fluid to said differential casing,
    (D) automatically operated valve means carried by said shroud for selectively controlling the flow of said hydraulic fluid to said mechanical gear train drive and said brake mechanisms
whereby said mechanical gear train drive will function as a fluid pump to apply pressure to cause said fluid operated brake mechanisms to perform a braking action and resist are free rotation of said mechanical gear train drive.

4. A variable locking differential comprising
    (A) fluid operated brake mechanism including
        (1) a plurality of brake plates,
        (2) a plurality of friction plates in association with said brake plates,
        (3) means for applying pressure to move said brake plates and said friction plates together,
    (B) a source of hydraulic fluid,
    (C) means for pumping said fluid under pressure against said means for applying pressure including
        (1) a series of automatic directional flow control valve assemblies in said differential,
        (2) said differential having a series of ports communicating said means for applying pressure, said valve assemblies and said source of hydraulic fluid
whereby said fluid operated brake mechanisms will be operated upon demand by said differential.

5. Apparatus for the transmitting of driving torque comprising a plurality of output shafts, a differential casing rotatably supported by said output shafts, a shroud fixed within said casing, a side gear removably attached to each of said output shafts and disposed one on each side of said should, a series of compensating gears carried by said shroud and meshing with said side gears to form a mechanical gear train drive, a series of automatic directional flow control valves carried by said shroud for introducing hydraulic fluid into the area of said compensating gears, and fluid operated brake mechanism carried by said differential casing and disposed adjacent to said side gears, whereby when one of said output shafts rotates more rapidly than the other output shaft said valve assemblies will automatically operate to introduce hydraulic fluid into the compensating gears and such compensating gears will operate as pumps to effect a braking action against the free rotation of the side gear carried by said rapidly rotating output shaft.

References Cited by the Examiner

UNITED STATES PATENTS 2,627,190 2/1953 Bottcher _____ 74—711
2,930,256 3/1960 Wildhaber _____ 74—711

FOREIGN PATENTS 1,083,711 6/1954 France.

DON A. WAITE, *Primary Examiner.*
BRAUGHTON G. DURHAM, *Examiner.*